United States Patent
Martens et al.

(10) Patent No.: US 7,221,642 B2
(45) Date of Patent: May 22, 2007

(54) OPTICAL DATA STORAGE MEDIUM AND USE OF SUCH MEDIUM

(75) Inventors: Hubert Cecile Francois Martens, Eindhoven (NL); Benno Tieke, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 499 days.

(21) Appl. No.: 10/501,416

(22) PCT Filed: Nov. 11, 2002

(86) PCT No.: PCT/EP02/50001
§ 371 (c)(1),
(2), (4) Date: Jul. 13, 2004

(87) PCT Pub. No.: WO03/060894
PCT Pub. Date: Jul. 24, 2003

(65) Prior Publication Data
US 2005/0083830 A1    Apr. 21, 2005

(30) Foreign Application Priority Data
Jan. 18, 2002 (EP) ................. 02075226
Apr. 2, 2002 (EP) ................. 02076286
Jul. 8, 2002 (EP) ................. 02077719

(51) Int. Cl.
*G11B 7/24* (2006.01)
(52) U.S. Cl. ............... 369/275.4; 369/288; 428/64.4
(58) Field of Classification Search ......... 369/275.1, 369/275.2, 275.3, 275.4, 275.5, 288, 283, 369/284, 277, 279, 278, 280; 428/64.1, 64.4–64.5, 428/64.8; 430/270.11, 270.21
See application file for complete search history.

(56) References Cited

U.S. PATENT DOCUMENTS

| | | | | |
|---|---|---|---|---|
| 5,213,859 A | * | 5/1993 | Aoi et al. | 428/64.8 |
| 5,369,321 A | * | 11/1994 | Koike et al. | 369/275.4 |
| 5,370,970 A | * | 12/1994 | Tanaka et al. | 430/270.21 |
| 6,028,836 A | * | 2/2000 | Kosuda et al. | 369/275.1 |
| 2006/0240357 A1 | * | 10/2006 | Martens et al. | 430/270.11 |

* cited by examiner

*Primary Examiner*—Ali Neyzari

(57) ABSTRACT

An optical data storage medium (20) for recording by means of a focused radiation beam (29) is described. The radiation beam having a wavelength λ enters through an entrance face (28) of the medium during recording. The medium has a substrate (21) with a surface (24) including a guide groove with a depth g. An inverted stack of layers is present on the substrate (21) including a reflective layer (24a) with a complex refractive index $\tilde{n}_{M\lambda}=n_{M\lambda}-i^*k_{M\lambda}$, in substantial conformity with the surface (24) of the substrate, a transparent layer (22) through which the radiation beam (29) is incident with a complex refractive index $\tilde{n}_{T\lambda}=n_{T\lambda}-i^*k_{T\lambda}$ and a recording layer (25) of a material having a complex refractive index $\tilde{n}_{R\lambda}=n_{R\lambda}-i^*k_{R\lambda}$ and having a thickness $d_{RG}$ in the groove portion and a thickness $d_{RL}$ in the portion between grooves. The recording layer is interposed between the reflective layer (24a) and the transparent layer (22). When $0.25/(3.0+k_{M\lambda}^2)+0.17 < g^*n_T/\lambda < 0.22/(3.0+k_{M\lambda}^2)+0.45$ and $0.2 < (d_{RG}-d_{RL})/g < 0.5$ and $0 < d_{RG} < \lambda/n_{R\lambda}$ and $k_{R\lambda} < 0.5$ and $2 < n_{R\lambda} < 2.6$ the sign of the push pull tracking signal is reversed. In such way the inverted recording stack is tracked properly without modifications to the optical drive and backwards compatibility is achieved.

10 Claims, 3 Drawing Sheets

OPTICAL DATA STORAGE MEDIUM AND USE OF SUCH MEDIUM

The invention relates to an optical data storage medium for recording by means of a focused radiation beam having a wavelength λ and entering through an entrance face of the medium during recording, at least comprising:

a substrate, with a surface including a guide groove with a depth g, a stack of layers on the substrate, which stack includes:

a reflective layer of a material having a complex refractive index $\tilde{n}_{M\lambda}=n_{M\lambda}-i^{*}k_{M\lambda}$ at the wavelength λ, $n_{M\lambda}$ denoting the real part and $k_{M\lambda}$ denoting the imaginary part of $\tilde{n}_{M\lambda}$, present adjacent the surface of the substrate in substantial conformity with the surface, a transparent layer through which the radiation beam is incident during recording and of a material having a complex refractive index $\tilde{n}_{T\lambda}=n_{T\lambda}-i^{*}k_{T\lambda}$, a recording layer of a material having a complex refractive index $\tilde{n}_{R\lambda}=n_{R\lambda}-i^{*}k_{R\lambda}$ and having a thickness $d_{RG}$ in the groove portion and a thickness $d_{RL}$ in the portion between grooves, being interposed between the reflective layer and the transparent layer.

The invention also relates to the use of such an optical data storage medium in an optical data storage medium reading/recording device.

An embodiment of such an optical data storage medium is known from Japanese patent application laid open nr. 11-066622. Regarding the market for optical recording, it is clear that the most important and successful format so far is a write-once format, Compact Disk Recordable (CD-R). Although the take-over in importance by Compact Disk Rewritable (CD-RW) has been predicted since a long time, the actual market size of CD-R media is still at least an order of magnitude larger than for CD-RW. Furthermore the most important parameter for drives is the maximum write speed for R-media, not for RW. A shift of the market to e.g. CD-RW is still possible, e.g. because of Mount Rainier standardization for CD-RW. However, the R-format has been proven very attractive due to its 100% compatibility.

Next to the Digital Versatile Disk ReWritable (DVD+RW) standard recently a new Digital Versatile Disk Rewritable (DVD+R) standard was developed. The new DVD+R standard gets increasing attention as an important support for DVD+RW. A possible scenario is that the end customers have become so familiar with an optical write-once format that they might accept it more easily than a re-writable format.

An issue for both the R and RW formats is the limited capacity and therefore recording time because only single-stacked media are present. For DVD-Video read only (DVD-Video-ROM), dual stacked media have a considerable market share. A dual-stack DVD+RW disk is probably feasible. However, it has become clear that a fully compatible disk, i.e. within the reflection, modulation and tracking specification of the dual-stack DVD-ROM, is very difficult to achieve. Without a full compatibility, the success of a dual-stack recordable, like DVD+R, in the market is questionable.

In said known optical data storage medium the guide groove or pregroove track comprises a spiral groove in the transparent substrate and the recording layer is a thin layer of, for example, an organic dye. A focused laser beam of sufficiently high intensity can produce an optically detectable change in the recording layer. The guide groove extends across the entire optical data storage medium surface, usually as a spiral. During recording the groove is employed for detecting the radial position of the laser write spot formed on the recording layer by the focused laser beam, relative to a groove, so that the radial position of the write spot can be corrected. As a result of this, less stringent requirements have to be imposed on the drive and guide mechanism for moving the write beam and the optical data storage medium relative to each other, enabling a simpler and cheaper construction to be used for the write apparatus.

The radial position of the laser write spot relative to the groove is detected by means of the so-called "push-pull" or differential method. This method employs two radiation-sensitive detectors arranged in the path of the beam that has been reflected from the optical data storage medium so that the detectors receive radially different portions of the reflected beam. The difference between the output signals of the two detectors contains information about the radial position of the laser spot relative to the groove. If the output signals are equal, the center of the laser spot coincides with the center of the groove or the center between two adjacent grooves. The differential tracking method can be used only if the depth of the grooves is such that the phase shift between the radiation reflected from a groove and the radiation reflected from the area surrounding the groove is approximately $(\frac{1}{2}+n)\pi$ where n=0 or an integer number. This phase shift is given by: $\Delta\phi=-4^{*}\pi^{*}n^{*}g/\lambda$, in which g is the groove depth, n the refractive index of the substrate material and λ the wavelength of the radiation used. Moreover, for an optimum tracking signal the amplitude of the radiation reflected from the groove must be equal to that of the radiation reflected from the area surrounding the groove.

These requirements are met if the recording layer is a relatively thin layer of equal thickness both inside the grooves and between the grooves as is the case for e.g. the Digital Versatile Disk ReWritable in which case a thin metal alloy is used which can be formed by vacuum-deposition or by means of a sputtering process.

It has been found that layers of specific dyes are very suitable for use as a recording layer on a pre-grooved optical data storage medium substrate. Such a dye may be, for example, a cyanine compound, which can be deposited by spincoating a solution of such a compound on the substrate surface. When a layer of dye is applied to a pre-grooved optical data storage medium substrate the grooves are filled partially or completely and the thickness of the layer at the location of the grooves $d_{RG}$ will generally be larger than the thickness $d_{RL}$ between the grooves. The area between the grooves is also called on-land. As a result of this difference in layer thickness, which is equal to the $d_{RG}-d_{RL}$, an additional phase shift occurs between the radiation reflected from the recording layer at the location of a groove and radiation reflected from the recording layer in the vicinity of the groove. This additional phase shift gives rise to a differential tracking signal which is different from the case in which $d_{RG}=d_{RL}$. A leveling parameter may defined as: Le=$(d_{RG}-d_{RL})$/g. When Le=1 the grooves are completely flattened out by the recording layer, that is the groove structure is not present anymore in the surface of the recording layer opposing the substrate. This could happen for very shallow grooves ($d_R$>>g). However, in most practical cases, e.g. Compact Disk Recordable (CD-R) or DVD Recordable (DVD+R) disks, the leveling parameter ranges from 0.2 to 0.5. For instance, for a typical DVD+R, the groove depth is 160 nm, the dye thickness in the groove is 100 nm and the dye thickness on-land is 40 Dm: Le=(100−40)/160=0.375. When the dye is deposited by a different technique such as evaporation the leveling can be nearly zero, i.e. the same thickness of dye on-land and in-groove.

In an organic dye-based recording stack, the recording process is optimal when the dye volume in which the data are recorded is confined within the grooves present on the surface of the substrate. In case of a normal recording stack, i.e. a CD-R or DVD+R disk, the grooved sections that confine the dye are pointing towards the laser's entry surface of the disk. In the case of an inverted stack, the grooves are pointing away from the laser's entry surface; in this case the land sections, which are in between the grooves, are pointing towards the laser's entry surface. Such an inverted stack structure is used for instance for the new Digital Video Recording Recordable (DVR-R) disk, which for the blue wavelength version is also called Blu-ray Disk (BD). Multi-stack designs may be represented by a symbol Ln in which n denotes 0 or a positive integer number. The stack at which the radiation beam arrives last, i.e. the deepest stack, is called L0, while each stack closer to the radiation source is represented by L1 . . . Ln. Thus in case of dual stack design two stacks L0 and L1 are present in which design L0 denotes the "lowest" recording layer and L1 denotes the "top" recording layer, of a dual-stack recordable DVD disk, as e.g. known from said Japanese Patent Application. Note that this convention deviates from earlier notations in which L0 was the stack closest to the radiation source. From now on, starting with the BD specification, this convention has been reversed. However, all current optical disk-drives (CD, DVD, DVR) are tuned to track on-groove, meaning tracking and focusing on the portion of the guide groove structure nearest to the plane of incidence of the laser-light beam. For CD and DVD this means tracking and focusing on the bottom of the groove, for the new DVR disk this means tracking and focusing on-land between the grooves. The L0 stack of a DVD+R dual stack disk and a DVR-R disk is inverted, in which case the reflective layer is present between the recording layer and the substrate and the laser light is incident through a transparent layer e.g. a cover layer (in case of DVR) or a spacer layer (in case of DVD+R dual stack). However, when the stack is inverted the push-pull signal should be inverted as a result of the requirement that the organic dye disks require in-groove recording, i.e. in the portion of the disk where the dye layer is thicker. For DVR RW on-groove is still needed. This means that for the DVR system the radial tracking should switch between on-groove for phase-change RW-media and in-groove for organic R-media. The same holds for going from stack L1 to stack L0 in a DVD+R dual stack medium. From the optical recording drive perspective, this is a very unfavorable situation because extra functionality has to be built into the drive in order to detect which type of layer or which stack level is to be addressed. Older drives do not have this functionality and therefore would not be compatible with the disks that require in-groove recording.

It is an object of the present invention to provide an optical data storage medium of the kind described in the opening paragraph, including an inverted recording stack, which can be tracked in standard push-pull mode with a standard optical recording device.

This object is achieved in accordance with the invention by an optical data storage medium as described in the opening paragraph, which is characterized in that the following requirements are fulfilled:

$$0.25/(3.0+k_{M\lambda}^2)+0.17 < g*n_T/\lambda < 0.22/(3.0+k_{M\lambda}^2)+0.45$$
and $0.2 < (d_{RG}-d_{RL})/g < 0.5$ and $0 < d_{RG} < \lambda/n_{R\lambda}$ and
$k_{R\lambda} < 0.5$ and $2 < n_{R\lambda} < 2.6$.

The invention is based on the recognition that for a specific groove depth range and for a specific wavelength of the radiation used a specific thickness and refractive index of the recording layer, the push-pull signal of the groove is reversed. By reversal is meant the sign of the slope of the push-pull signal when tracking. By this reversal, during tracking, the laser spot will shift from groove to between groove or vice versa. See for further explanation of the reversal the explanation in the description of FIG. 1, where a comparison is made between the "normal" and the reversed push pull signal. The push-pull sign reversal has the advantage that an optical disk-drive that tracks normal stacks on-groove, will automatically track the inverted stack of an optical data storage medium according to the invention, in-groove, which, as explained above, improves the quality of recorded data in the dye. The reflective layer can be characterized by one parameter only, it's $k_{M\lambda}$-value (the imaginary part of the complex refractive index at wavelength $\lambda$). The formula is valid both for dielectric and metallic mirrors. The guide groove, normally formed as a spiral, has a pitch p and preferably has an average width w in the range of 0.3 to 0.7 times p. The present idea is applicable in case of any inverted recording stack where in-groove recording is required in an on-groove tracking drive e.g. in DVR-R or BD-R and in the L0 stack of a DVD+R or BD dual stack medium. The push-pull signal may be calculated with scalar diffraction calculations as published in *Principles of Optical Disc Systems* by G. Bouwhuis, J. Braat, A. Huijser, J. Pasman, G. van Rosmalen, and K. Schouhamer Immink, Adam Hilger Ltd, Bristol (1985). Generally the push-pull signal is derived by subtracting the signals $I_R$ and $I_L$ from the right and left detector halve of a split detector which is present in the reflected light path of the laser beam during scanning of the guide groove. In optical disk standard specifications the push-pull signal is normally defined as a normalized parameter $PP=<I_R-I_L>/[I_R+I_L]$ in which formula $<I_R-I_L>$ denotes the maximum difference of $I_R-I_L$ and $[I_R+I_L]$ denotes the average value of $I_R+I_L$ when the laser spot moves radially outwards across the guide grooves. Note that this PP is not the same as the unnormalized push pull signal denoted by *PP* (in italics) which can be defined as $(I_R-I_L)$. The push-pull *PP* signal for an inverted stack as a function of groove depth for typical in-groove layer thickness and optical constants of the recording layer shows a sign reversal when the depth g of the guide groove is in the specified range of claim 1 and the other conditions of claim 1 are fulfilled. Similar results are obtained for different mirror materials and in case of additional protection, interference, deformation, and/or heat-sink layer(s) on top of the dye or in between the dye and the mirror. A different track pitch and/or groove width may influence the amplitude of the push-pull, but leaves the sign of the push-pull unchanged. According to the DVD+R standard, the phase depth of the grooves should not exceed 90 degrees, this means that in the presented calculations the push-pull of the normal stack should be positive. Indeed, for the typical DVD+R parameters mentioned above, the push-pull is found to be positive. Notice that in contrast to the push-pull of a normal stack, the push-pull of the inverted stack always start with a negative sign for increasing groove depths; this is a natural consequence of the inverted stack structure. For Le=0, the push-pull of the inverted stack has even always the opposite sign of the push-pull of the normal stack.

In an embodiment the reflective layer is a metal layer having a thickness $d_M > 20$ nm and $g*n_T/\lambda < 0.50$. Frequently the reflective layer will constitute a metal layer, which has the advantage of a high reflection at a certain minimum thickness. Metals generally have a k-value larger than 1.5. Suitable metals are e.g. Ag, Al, Cu, Au or alloys thereof.

In another embodiment $0.25 < g*n_T/\lambda$ and $k_{M\lambda} < 0.5$. When $k_{M\lambda} < 0.5$ the reflective layer e.g. is dielectric layer. In this case the requirement is represented by a more simplified formula.

In another embodiment $\lambda$ has a value selected from the range of 650–665 nm and $k_{R\lambda} \leq 0.2$ at this value of $\lambda$. The present DVD+R(W) disks are all recorded with a laser beam having a wavelength between 650 and 665 nm. In this case reversed push pull signal results are obtained when in nanometers:

$$0.5*d_{RG}+42 < g < 0.5*d_{RG}+125 \text{ and } 70 < d_{RG} < 130.$$

Preferably 100 nm < g < 160 nm. When g is within this range the Push Pull signal amplitude is within the limits as specified in the DVD+R(W) standard.

In yet another embodiment $\lambda$ has a value selected from the range of 400–410 nm and $k_{R\lambda} \leq 0.20$ at this value of $\lambda$. Future generation disks, e.g. DVR or BD, are recorded and/or read out using a laser beam having a wavelength between e.g. 400 and 410 nm. In this case reversed push pull signal results are obtained when in nanometers:

$$0.5*d_{RG}+20 < g < 0.75*d_{RG}+95 \text{ and } 30 \text{ nm} < d_{RG} < 80$$
nm. Preferably 70 nm < g < 110 nm.

Dielectric layers may be made of a mixture of ZnS and $SiO_2$, e.g. $(ZnS)_{80}(SiO_2)_{20}$. Alternatives are, e.g. $SiO_2$, $TiO_2$, ZnS, AlN and $Ta_2O_5$. For the metal reflective layer, metals such as Al, Ti, Au, Ni, Cu, Ag, Cr, Mo, W, and Ta and alloys of these metals, can be used.

The transparent layer of the optical data storage medium is at least transparent for the laser wavelength. In a typical example, the substrate is disk-shaped and has a diameter of 120 mm and a thickness of 0.1, 0.6 or 1.2 mm. The substrate may be opaque when the laser-light beam enters the stack via the side opposite from the side of the substrate. In the latter case the metal reflective layer of the stack is adjacent the substrate. This is also referred to as an inverted stack. An inverted stack is e.g. also used in the DVR or BD disk.

The guide groove is often constituted by a spiral-shaped groove and is formed in the substrate or transparent layer by means of a mould during injection molding or pressing. These grooves can be alternatively formed in a replication process in the synthetic resin of the spacer layer, for example, a UV light-curable acrylate The outermost layer of the stack, i.e. the layer farthest from the reflective layer, is screened from the environment by means of a protective layer e.g. a second substrate or a cover layer and is made, for example, of polycarbonate, polymethyl methacrylate (PMMA), amorphous polyolefin or glass or a relatively thick layer of, for example, UV light-cured poly(meth)acrylate. This protective layer must be of good optical quality, i.e. substantially free from optical aberrations and substantially uniform in thickness, when the laser-light enters the recording stacks via the protective layer. For DVR disks this cover layer has a thickness of 0.1 mm.

Both the metal reflective layer and the dielectric layer may be provided by evaporation or sputtering. High-density recording may be achieved by using a short-wavelength laser, e.g. with a wavelength of 660 nm or shorter (red to blue).

The invention will be elucidated in greater detail with reference to the accompanying drawings, in which FIG. 1 shows the push pull signal as a function of the radial position of the spot of a focused radiation beam with respect to a guide groove geometry, FIG. 2 is a schematic layout of a dual-layer recordable optical disc (e.g. a DVD+R-DL) consisting of two separate substrates with guide grooves.

Figure 1:
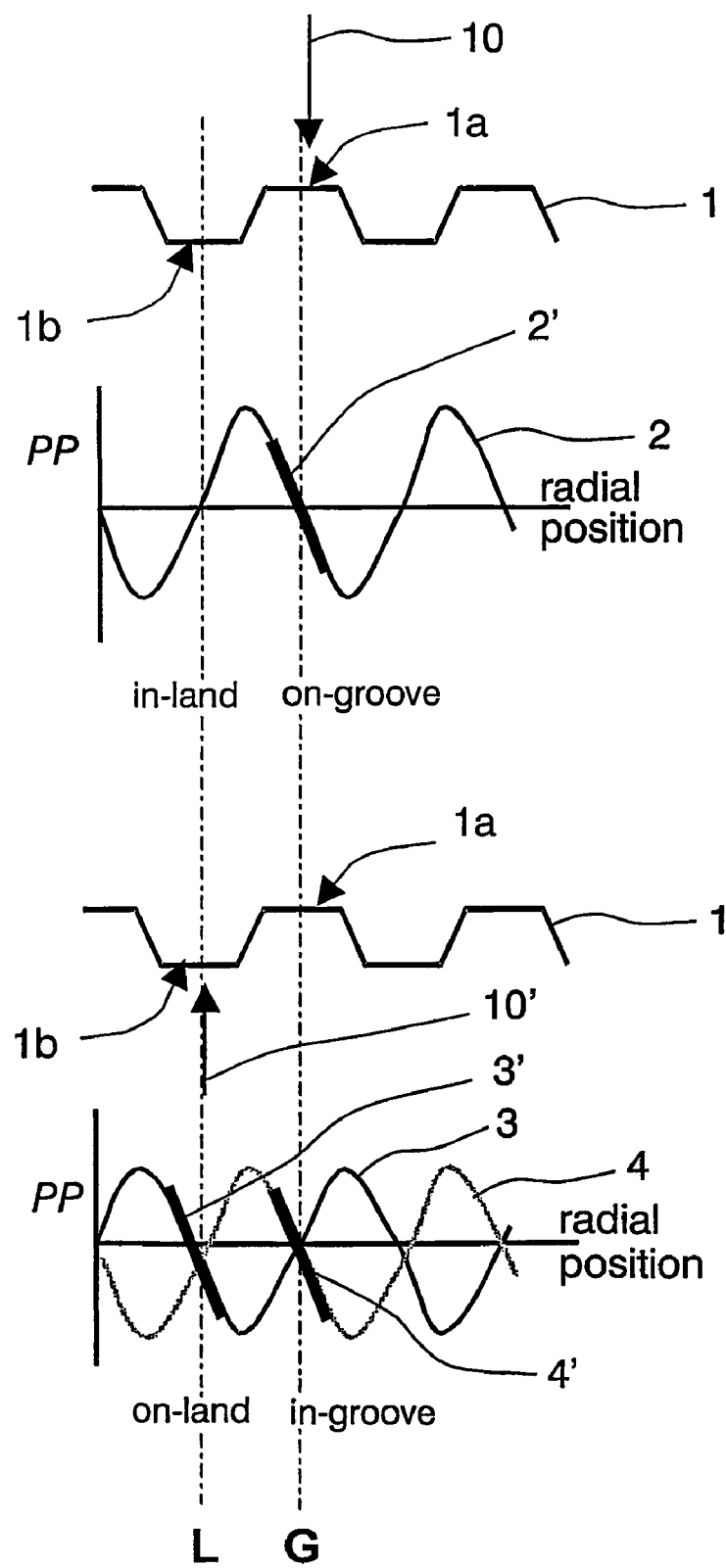

In FIG. 1 a cross section 1 of a portion of a spiral guide groove is shown present in the surface of a substrate. Graph 2 represents the unnormalized push-pull signal PP when the spot of the focused laser beam scans across the grooves in radial direction in case of a normal stack structure in which case the bottom plane 1a of the grooves, also called "groove" indicated by G, is closest to the laser source 10. The top plane of the groove is denoted by 1b and is also called "land" indicated by L. Graph 3 represents the unnormalized push-pull signal PP when the spot of the focused laser beam scans across the grooves in radial direction in case of a reversed stack structure in which case the bottom plane 1a of the grooves is farthest from the laser source 10'. The servo system of the optical drive for tracking the guide groove is normally adjusted to a negative slope of the PP signal denoted by 2' in which case on-groove tracking is achieved. Now, in case of an inverted stack the laser beam scans the groove structure from the other side as indicated by arrow 10' in this case the PP signal is represented by graph 3 and the servo system of the optical drive tracks the guide groove on-land 1b because it is adjusted to a negative slope 3' of the PP signal. However, in case of an inverted stack, including a dye, in-groove tracking is preferred and therefore a sign inversion of the PP signal is required. This inversion is indicated by graph 4 and the inversion achieves the preferred in-groove tracking while the servo adjusts to the negative slope of 4'. The inversion of the PP signal is achieved by limiting the depth of the guide groove 1 to the ranges as claimed in claim 1.

Figure 2:
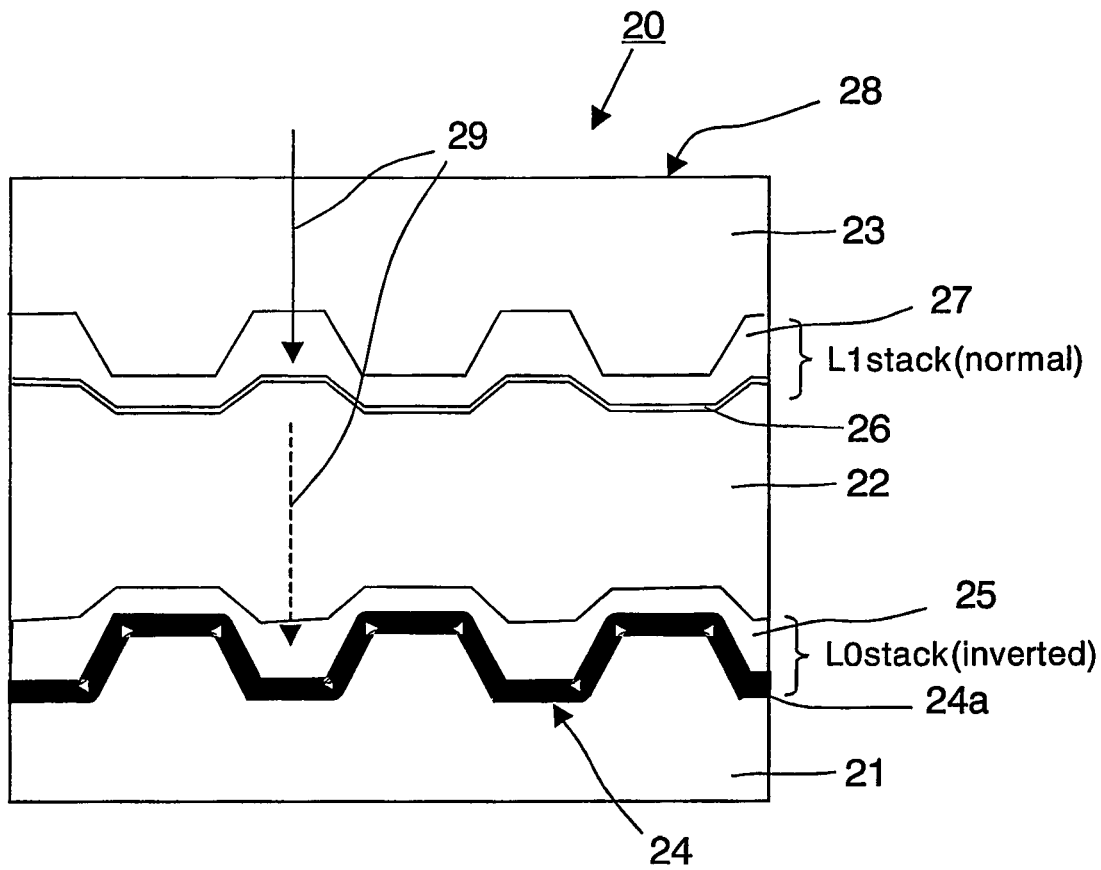

In FIG. 2 a schematic cross-section of an optical data storage medium 20 (e.g. a DVD+R-DL) for recording by means of a focused laser beam 29 having a wavelength $\lambda$ is shown. The laser beam enters and entering through an entrance face of the medium during recording. The medium comprises a substrate 21, with a surface including a guide groove with a depth g. A stack of layers L0 on the substrate includes a reflective layer 24a of a metal, for instance Ag, Au, Cu, Al, or alloys thereof having a complex refractive index $\tilde{n}_{M\lambda} = n_{M\lambda} - i*k_{M\lambda} (=0.072-4.4i$ for Ag at 655 nm). The reflective layer 24a is present adjacent the surface 24 of the substrate in substantial conformity with the surface. A transparent layer 22 is present through which the radiation beam 29 is incident during recording and of a material having a complex refractive index $\tilde{n}_{T\lambda} = n_{T\lambda} - i*k_{T\lambda}$ at the wavelength $\lambda$, $n_T$ denoting the real part and $k_T$ denoting the imaginary part of $\tilde{n}_{T\lambda}$. A recording layer 25 having a complex refractive index $\tilde{n}_{R\lambda} = n_{R\lambda} - i*k_{R\lambda}$ and having a thickness $d_{RG}$ in the groove portion and a thickness $d_{RL}$ in the portion between grooves is interposed between the reflective layer 25 and the transparent layer 22. The wavelength $\lambda$ has a value of 655 nm. The dye is of the azo type and has a complex refractive index of $\tilde{n}_{R\lambda} = 2.24 - i*0.02$. The thickness of the dye layer in groove $d_{RG}$ is 100 nm. The groove depth g is 135 nm. A transparent protective layer may be present between the recording layer and the transparent spacer layer 22.

The medium 20 further comprises a second substrate 23 and an L0 stack comprising a semi reflective layer 26 and a recording layer 27 of the dye type. Note that the L1 stack is a normal stack, i.e. not inverted. The transparent layer 22 is a spacer layer attaching the two separate pre-grooved substrates 21 and 23, each carrying a recording stack. For such a disk the dye-filled grooves in the L1-stack point towards the laser's entry surface 28 of the disk, while the dye-filled grooves in the L0 stack are pointing away from the laser's entry surface 28, i.e. L0 is an inverted recording stack.

Figure 3:
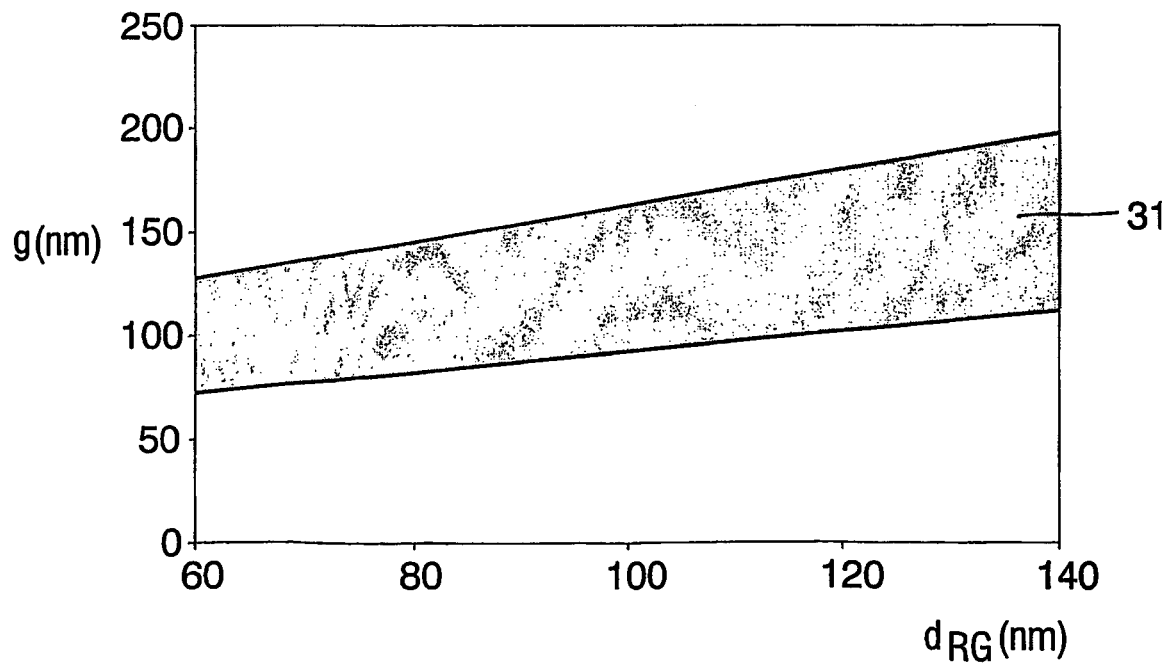
FIG. 3 shows the preferred groove depth range (shaded area) for an inverted recordable DVD-type stack as a function of the dye thickness in the groove.

In FIG. 3 a diagram is drawn in which the shaded area 31 indicates the preferred groove depth range as a function of the dye thickness $d_{RG}$, which is the dye thickness in the groove. The diagram is valid for a radiation beam wavelength of 650 to 665 nm. The dye has a refractive index of $n_{R\lambda}=2$ to 2.6 and absorption coefficient of $k_{R\lambda}<0.2$. The reflective layer 24a is made of Ag which has a complex refractive index 0.072–4.4i.

Figure 4:
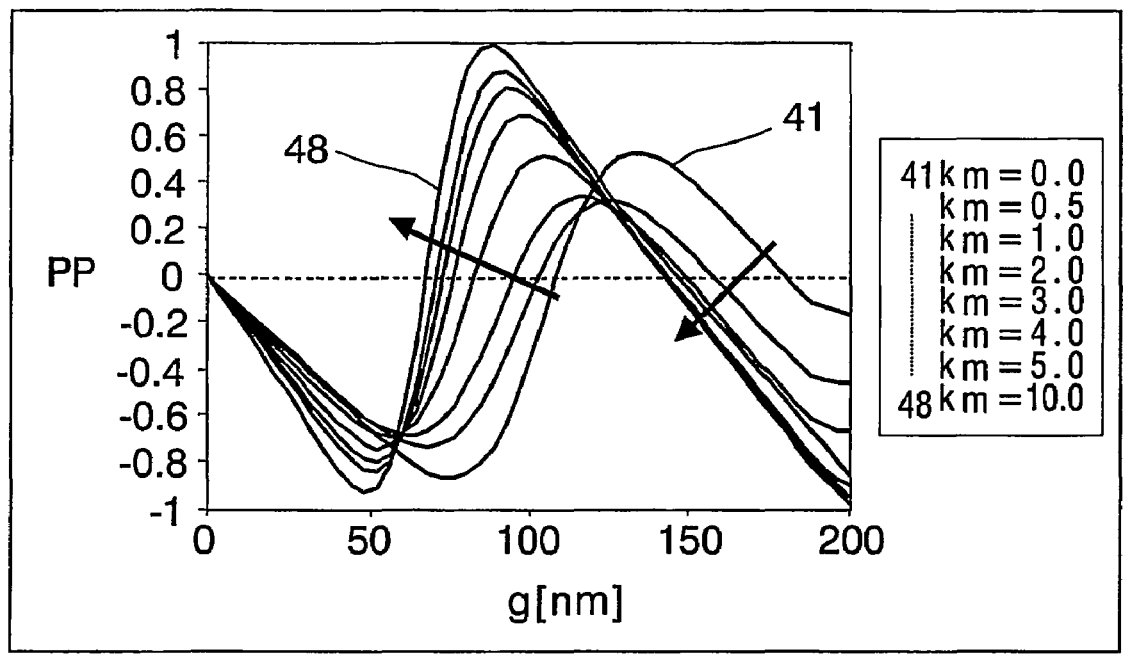
FIG. 4 shows the modelled sign of the push-pull signal as a function of $k_M$ of the reflective layer. The arrows indicate the effect of increasing $k_M$.

In FIG. 4 modelling results are shown for the sign of the push pull signal PP as a function of the groove depth g. The sign of the PP signal is normally negative, which means that a positive value corresponds to PP sign reversal. Curve 41 represents the relation when a reflective layer 24a (see FIG. 2) is present with a $k_M$ value of 0. Curve 48 represents the relation when a reflective layer 24a (see FIG. 2) is present with a $k_M$ value of 10.0. Furthermore curves representing intermediate values of $k_M$ are drawn. It can be seen that for higher values of $k_M$ the range where the sign of the push pull signal is positive, i.e. reversed, shifts to lower values. The modelling was performed with the following parameter settings: $d_{RG}=75$ nm dye and $n_R=2.5$, $k_R=0.05$, a 110 nm reflective layer and $n_M=1.4$. The wavelength $\lambda=655$ nm and the levelling of the dye L=0.40.

Figure 5:
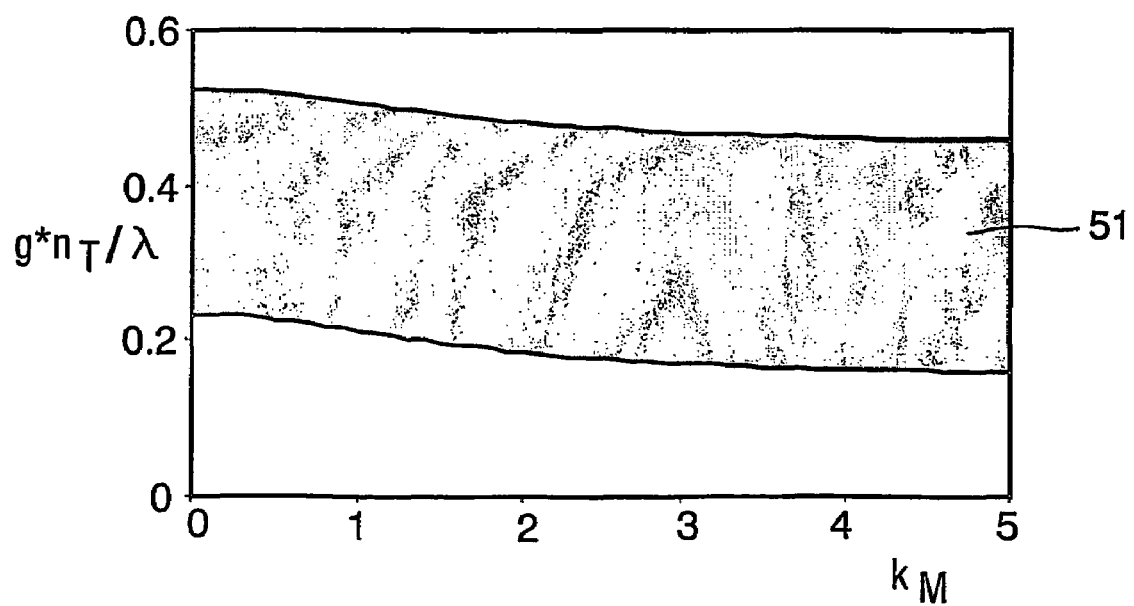
FIG. 5 shows the normalized groove depth range for sign-inversion of the push-pull of an inverted stack as a function of the $k_M$-value of the reflective layer.

In FIG. 5 a diagram is drawn in which the shaded area 51 indicates the normalized groove depth range $g^*n_T/\lambda$ as a function of the value $k_M$ of the reflective layer in which PP sign reversal occurs. In fact this diagram is a visualization of the following equation:

$$0.25/(3.0+k_{M\lambda}^2)+0.17<g^*n_T/\lambda<0.22/(3.0+k_{M\lambda}^2)+0.45.$$

Further, the following requirements must be met: $0.2<(d_{RG}-d_{RL})/g<0.5$ and $0<d_{RG}<\lambda/n_{R\lambda}$ and $k_{R\lambda}<0.5$ and $2<n_{R\lambda}<2.6$.

It should be noted that the above-mentioned embodiments illustrate rather than limits the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention an optical data storage medium for recording by means of a focused radiation beam is described. The radiation beam having a wavelength $\lambda$ enters through an entrance face of the medium during recording. The medium has a substrate with a surface including a guide groove with a depth g. A inverted stack of layers is present on the substrate including a reflective layer with a complex refractive index $\tilde{n}_{M\lambda}=n_{M\lambda}-i^*k_{M\lambda}$, in substantial conformity with the surface of the substrate, a transparent layer through which the radiation beam is incident with a complex refractive index $\tilde{n}_{R\lambda}=n_{R\lambda}-i^*k_{R\lambda}$ and a recording layer of a material having a complex refractive index $\tilde{n}_{R\lambda}=n_{R\lambda}-i^*k_{R\lambda}$ and having a thickness $d_{RG}$ in the groove portion and a thickness $d_{RL}$ in the portion between grooves. The recording layer is interposed between the reflective layer (24a) and the transparent layer. When $0.25/(3.0+k_{M\lambda}^2)+0.17<g^*n_T/\lambda<0.22/(3.0+k_{M\lambda}^2)+0.45$ and $0.2<(d_{RG}-d_{RL})/g<0.5$ and $0<d_{RG}<\lambda/n_{R\lambda}$ and $k_{R\lambda}<0.5$ and $2<n_{R\lambda}<2.6$ the sign of the push pull tracking signal is reversed. In such way the inverted recording stack is tracked properly without modifications to the optical drive and backwards compatibility is achieved.

The invention claimed is:

1. An optical data storage medium for recording by means of a focused radiation beam having a wavelength $\lambda$ and entering through an entrance face of the medium during recording, at least comprising:
   a substrate, with a surface including a guide groove with a depth g,
   a stack of layers on the substrate, which stack includes:
   a reflective layer of a material having a complex refractive index $\tilde{n}_{M\lambda}=n_{M\lambda}-i^*k_{M\lambda}$ at the wavelength $\lambda$, $n_M$ denoting the real part and $k_M$ denoting the imaginary part of $\tilde{n}_{T\lambda}$, present adjacent the surface of the substrate in substantial conformity with the surface, a transparent layer through which the radiation beam is incident during recording and of a material having a complex refractive index $\tilde{n}_{T\lambda}=n_{T\lambda}-i^*k_{T\lambda}$,
   a recording layer of a material having a complex refractive index $\tilde{n}_{R\lambda}=n_{T\lambda}-i^*k_{R\lambda}$ and having a thickness $d_{RG}$ in the groove portion and a thickness $d_{RL}$ in the portion between grooves, being interposed between the reflective layer and the transparent layer,
   characterized in that the following requirements are fulfilled:

$$0.25/(3.0+k_{M\lambda}^2)+0.17<g^*n_T/\lambda<0.22/(3.0+k_{M\lambda}^2)+0.45$$
   $$\text{and } 0.2<(d_{RG}-d_{RL})/g<0.5 \text{ and } 0<d_{RG}<\lambda/n_{R\lambda} \text{ and}$$
   $$k_{R\lambda}<0.5 \text{ and } 2<n_{R\lambda}<2.6.$$

2. An optical data storage medium as claimed in claim 1 wherein the reflective layer is a metal layer having a thickness $d_M>20$ nm and $g^*n_T/\lambda<0.50$.

3. An optical data storage medium as claimed in claim 1, wherein $0.25<g^*n_T/\lambda$ and $k_{M\lambda}<0.5$.

4. An optical data storage medium as claimed in claim 1, wherein $\lambda$ has a value selected from the range of 650–665 nm and $k_{R\lambda}\leq0.2$ at this value of $\lambda$.

5. An optical data storage medium as claimed in claim 4, wherein in nanometers:

$$0.5^*d_{RG}+42<g<0.5^*d_{RG}+125 \text{ and } 70<d_{RG}<130.$$

6. An optical data storage medium as claimed in claim 5, wherein 100 nm<g<160 nm.

7. An optical data storage medium as claimed in claim 1, wherein $\lambda$ has a value selected from the range of 400–410 nm and $k_{R\lambda}\leq0.20$ at this value of $\lambda$.

8. An optical data storage medium as claimed in claim 7, wherein in nanometers:

$$0.5^*d_{RG}+20<g<0.75^*d_{RG}+95 \text{ and } 30 \text{ nm}<d_{RG}<80 \text{ nm}.$$

9. An optical data storage medium as claimed in claim 8, wherein 70 nm<g<110 nm.

10. Use of an optical data storage medium as claimed in claim 1, in an optical data storage medium recording/reading device suitable for tracking of the portion of the guide groove of an optical data storage medium nearest to the plane of incidence of the focused radiation beam.

* * * * *